L. W. CHUBB.
ELECTROLYTIC APPARATUS.
APPLICATION FILED JAN. 10, 1917.

1,250,141.

Patented Dec. 18, 1917.

WITNESSES:
William Siler
R. D. Brown

INVENTOR
Lewis W. Chubb
BY
Wesley G. Carr
ATTORNEY

UNITED STATES PATENT OFFICE.

LEWIS W. CHUBB, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

ELECTROLYTIC APPARATUS.

1,250,141.   Specification of Letters Patent.   Patented Dec. 18, 1917.

Application filed January 10, 1917. Serial No. 141,617.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Electrolytic Apparatus, of which the following is a specification.

My invention relates to electrolytic apparatus, such as condensers, lightning arresters and the like, and it has for its object to provide electrolytic cells of the above-indicated character which shall include means for supporting the active plates in rigid and spaced relation to one another by means of spacing members composed of film-forming material. My invention also comprises a special arrangement of the plates composing the device whereby the plates composing each set of the same polarity are rigidly fastened together but are entirely free from mechanical engagement with the plates composing the other set.

Electrolytic condensers, lightning arresters, rectifiers and similar electrolytic cells depend for their proper operation upon the maintenance of asymmetric conducting films upon the surfaces of the active electrodes, such films being exceedingly thin and easily ruptured. When cells of large capacity are desired, it is necessary to provide means for maintaining the plates the proper distances apart. Spacing members for this purpose have heretofore usually consisted of bodies of insulating material between which the plates are clamped, but spacing devices of this character are found to be unsatisfactory because slight relative movements are almost certain to occur between the spacers and the plates, such rubbing movements resulting in rupture of the film and consequent failure of the electrical valve action of the apparatus, either wholly or in part. The discontinuity of the film at the joints between the insulating spacers and the plates also causes deterioration and it is of course impracticable to fasten adjacent plates rigidly together by riveting or the like, since the plates must be maintained out of electrical contact.

According to my present invention, I provide an electrolytic cell consisting of a series of parallel plates composed of aluminum, magnesium or some other film-forming metal, the plates of the same polarity being rigidly fastened together by means of rods carrying sets of spacers of film-forming metal which extend freely and without contact through openings provided in the plates of opposite polarity.

Figure 1:
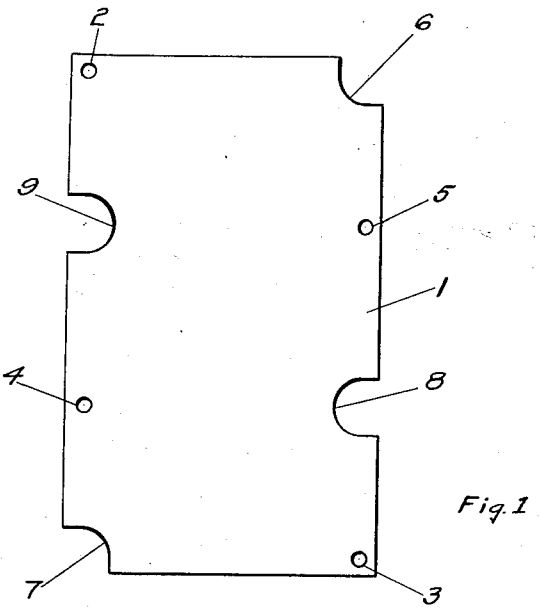
Figure 2:
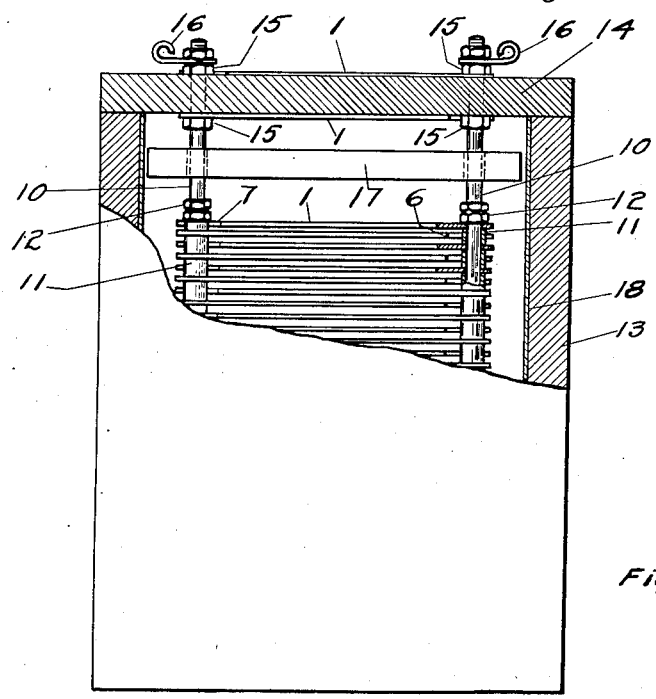

One embodiment of my invention is illustrated in the accompanying drawing, in which Figure 1 is a plan view of a condenser plate constructed in accordance with my invention, and Fig. 2 is a side view, partially in elevation and partially in vertical section, showing a condenser comprising a set of plates similar to that shown in Fig. 1.

The plate 1 shown in Fig. 1 of the drawing is of generally rectangular shape and is provided with two small openings 2 and 3 at diagonally opposite corners and with other openings 4 and 5 disposed near the longer edges of the plate. The remaining corners of the plate are cut away, as shown at 6 and 7, and two large notches 8 and 9 are formed in the longer edges of the plate opposite to the perforations 4 and 5.

A series of plates of the above-described form are built up to form a condenser by reversing the position of each alternate plate so that the perforations 2, 3, 4 and 5 will register with the corresponding and symmetrically disposed larger openings 6, 7, 8 and 9. Rods 10, which may be composed of aluminum or of some other metal coated with aluminum or other film-forming metal are passed through each of the eight sets of registered openings 2—6, 9—5, 4—8 and 7—3 in the plates, washers or bushings 11 of aluminum or other film-forming metal being placed around the rods 10 to separate the plates of the same polarity. The washers 11 may be composed wholly of film-forming metal or of some other metal coated with such a metal. A structure of this kind is shown in Fig. 2, the large openings 6 and 7, as shown therein, being large enough to permit the washers 11 to extend freely through them without contact. Clamping nuts 12 are applied to the rods 10 to clamp the plates 1 in firm and rigid relation to one another, and the whole structure is inclosed within a tank 13, the upper ends of the rods 10 extending through a cover 14 and being fastened in place by means of nuts 15 which also serve to clamp a pair of plates 1 to the upper and lower sides of the cover 14, thereby insuring good electrical contact between the plates of the condenser and the rods 10. Suitable terminals 16 may be attached to the upper ends of any one of the rods 10 that are associated with the sets of plates of opposite polarity, and a splash board 17 may be supported upon the rods 10, if desired, between the cover 14 and the plates 1. The tank 13 may be constructed of wood, enamel-lined metal or of any other suitable material and may be provided, if desired, with a lining 18 of aluminum or other film-forming metal.

The structural details of the apparatus which I have shown and described may be variously modified without exceeding the limits of my invention, and I therefore desire that no limitations shall be imposed upon my invention except such as are indicated in the appended claims.

I claim as my invention:

1. An electrolytic cell comprising a plurality of plates of film-forming metal and means, having exposed surfaces of film-forming metal, for maintaining the said plates in spaced relation.

2. An electrolytic cell comprising a plurality of plates of film-forming metal and means, composed wholly of film-forming metal, for maintaining the said plates in spaced relation.

3. An electrolytic cell comprising a plurality of plates of film-forming metal and supporting and spacing means for the said plates composed wholly of film-forming metal.

4. An electrolytic cell comprising a plurality of sets of alternated plates of film-forming metal and supporting and spacing means adapted for immersion in an electrolyte, the exposed surfaces of said supporting and spacing means being composed exclusively of film-forming metal.

5. An electrolytic cell comprising a plurality of sets of immersed alternated plates of film-forming metal, the plates composing the respective sets being fastened together by mechanically independent spacing and supporting structures.

6. An electrolytic cell comprising a plurality of plates adapted for immersion in an electrolyte and immersed means for maintaining the said plates in alternately connected and spaced relation, all of the immersed surfaces of the said plates and spacing means being composed of film-forming metal.

7. An electrolytic cell comprising two sets of plates of film-forming metal maintained in alternately connected and spaced relation, and spacing members for rigidly clamping the plates composing each set of alternate plates, the said spacing members extending through openings in the plates composing the other set.

8. An electrolytic cell comprising two sets of plates of film-forming metal maintained in alternately connected and spaced relation, and spacing members, having exposed surfaces of film-forming metal, for rigidly clamping the plates composing each set of alternate plates, the said spacing members extending through openings in the plates composing the other set.

9. An electrolytic cell comprising two sets of plates of film-forming metal maintained in alternately connected and spaced relation, and spacing members, composed wholly of film-forming metal, for rigidly clamping the plates composing each set of alternate plates, the said spacing members extending through openings in the plates composing the other set.

10. An electrolytic cell comprising a plurality of horizontal plates of film-forming metal and means having exposed surfaces of film-forming metal for maintaining the said plates in spaced relation.

11. An electrolytic cell comprising a plurality of horizontal plates of film-forming metal provided with sets of registering openings, the registering openings in adjacent plates being alternately large and small, rods extending through the said sets of registering openings, and spacing members of smaller diameter than the said larger openings and surrounding the said rods.

12. An electrolytic cell comprising two sets of plates of film-forming metal maintained in alternately connected and spaced relation, the said plates being severally provided with a plurality of openings of two different sizes, the larger openings in each plate being so disposed as to register with the smaller openings in the adjacent plates, rods extending through the registering openings in the said plates and spacing members of film-forming material surrounding the said rods between the said plates, said spacing members being of less diameter than the said larger openings in the plates.

In testimony whereof, I have hereunto subscribed my name this 27th day of Dec., 1916.

LEWIS W. CHUBB.